US012682905B2

(12) United States Patent
Kim et al.

(10) Patent No.: US 12,682,905 B2
(45) Date of Patent: Jul. 14, 2026

(54) VOICE DATA TRANSMISSION METHOD AND APPARATUS

(71) Applicant: SAMSUNG SDS CO., LTD., Seoul (KR)

(72) Inventors: Jung Ho Kim, Seoul (KR); Young Kwang Kim, Seoul (KR); Soo Hwan Park, Seoul (KR); Sang Wook Lee, Seoul (KR); Dong Ho Cha, Seoul (KR); Jun Ho Kang, Seoul (KR); Hee Tae Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 252 days.

(21) Appl. No.: 18/405,092

(22) Filed: Jan. 5, 2024

(65) Prior Publication Data

US 2024/0363120 A1 Oct. 31, 2024

(30) Foreign Application Priority Data

Apr. 27, 2023 (KR) ........................ 10-2023-0055615

(51) Int. Cl.
*G10L 17/02* (2013.01)
*G10L 15/30* (2013.01)
*G10L 25/51* (2013.01)
*H04L 65/403* (2022.01)

(52) U.S. Cl.
CPC .............. *G10L 17/02* (2013.01); *G10L 25/51* (2013.01)

(58) Field of Classification Search
CPC ......... G10L 17/02; G10L 25/51; G10L 17/00; G10L 15/30; H04M 3/569; H04M 3/56; H04L 65/403; H04L 67/563
See application file for complete search history.

(56) References Cited

U.S. PATENT DOCUMENTS

| | | | | |
|---|---|---|---|---|
| 2003/0125954 A1* | 7/2003 | Bradley | ................. | H04N 7/152 |
| | | | | 348/E7.084 |
| 2006/0055771 A1 | 3/2006 | Kies | | |
| 2013/0204607 A1* | 8/2013 | Baker, IV | ............... | G10L 17/00 |
| | | | | 704/235 |
| 2016/0180852 A1* | 6/2016 | Huang | .................. | H04M 3/568 |
| | | | | 704/246 |
| 2022/0279073 A1 | 9/2022 | Li et al. | | |

FOREIGN PATENT DOCUMENTS

| | | | | | |
|---|---|---|---|---|---|
| CA | 2615459 | A1 * | 1/2007 | | |
| CN | 116156099 | A * | 5/2023 | ............. | H04N 7/152 |
| EP | 3694146 | A1 * | 8/2020 | ........ | H04L 12/1827 |
| JP | 2004-53763 | A | 2/2004 | | |
| JP | 2004-187170 | A | 7/2004 | | |
| JP | 2018-56766 | A | 4/2018 | | |
| KR | 10-2021-0124655 | A | 10/2021 | | |
| KR | 10-2022-0030236 | A | 3/2022 | | |

* cited by examiner

*Primary Examiner* — Daniel C Washburn
*Assistant Examiner* — Penny L Caudle
(74) *Attorney, Agent, or Firm* — Sughrue Mion, PLLC

(57) ABSTRACT

A method for transmitting voice data is provided. The method may include receiving voice data of a particular speaker from a voice data collection server; determining whether destination terminals are first-type terminals; and based on a determination that the destination terminals are the first-type terminals, transmitting the received voice data to the destination terminals through a channel corresponding to the particular speaker, from among a plurality of pre-defined channels for the destination terminals.

16 Claims, 10 Drawing Sheets

8a

| index table | |
|---|---|
| server ssrc | Index |
| $S_0$ | 0 |
| $S_1$ | 1 |
| . | . |
| $S_m$ | m |

8b

| mapping table | | | | |
|---|---|---|---|---|
| index | server ssrc | virtual ssrc | real ssrc | time stamp |
| 0 | $S_0$ | $V_0$ | $R_0$ | $T_0$ |
| 1 | $S_1$ | $V_1$ | $R_1$ | $T_1$ |
| 2 | $S_2$ | $V_2$ | $R_2$ | $T_2$ |
| . | . | . | . | . |
| m | $S_m$ | $V_m$ | $R_m$ | $T_m$ |

FIG. 8

VOICE DATA TRANSMISSION METHOD AND APPARATUS

CROSS-REFERENCE TO RELATED APPLICATION

This application claims priority from Korean Patent Application No. 10-2023-0055615 filed on Apr. 27, 2023, in the Korean Intellectual Property Office, and all the benefits accruing therefrom under 35 U.S.C. 119, the contents of which in its entirety are herein incorporated by reference.

BACKGROUND

1. Field

The present disclosure relates to a voice data transmission method and apparatus, and more particularly, to a voice data transmission method capable of transmitting voice data of multiple speakers through a pre-configured channel between a terminal and a server, and a system to which the voice data transmission method is applied.

2. Description of the Related Art

Among the terminals of speakers participating in an online conference, there may be terminals with capabilities to receive voice data of the speakers through a single channel, analyze the voice data independently to identify the speakers, and to reproduce the voice data on a speaker-by-speaker basis and terminals with no such capabilities.

In a conference system that simultaneously supports different types of terminals with different processing capacities for voice data, terminals that cannot process voice data by identifying speakers from received voice data from the server require as many transmission channels for voice data as there are speakers participating in the conference.

This may not be a problem when the number of speakers participating in the conference is small, but in the presence of a large number of speakers, a significant amount of system resources may be consumed to create and manage transmission channels for all the speakers, potentially leading to quality issues such as noise and network traffic during the transmission of voice data.

Hence, there is a need for technology that may address issues such as unnecessary consumption of system resources, transmission delays in voice data, and quality degradation.

SUMMARY

Aspects of the present disclosure provide a method and apparatus for providing suitable voice data to each terminal in a conference system that includes terminals with different processing capabilities for voice data.

Aspects of the present disclosure also provide a voice data transmission method and apparatus that may offer a voice data sharing service with minimal resources regardless of the scale of a conference.

Aspects of the present disclosure also provide a method and device for transmitting voice data through a number of channels less than the number of speakers present in a conference.

Aspects of the present disclosure also provide a voice data transmission method and device that allows a conference to proceed smoothly without degradation in the quality of voice data or delays in transmission, even when transmitting voice data using fewer channels than the number of speakers attending the conference.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to the aforementioned and other embodiments of the present disclosure, even if the types of terminals used by speakers attending a conference are different, usability and satisfaction may be improved by establishing transmission channels for voice data that are suitable for the respective terminal types.

Additionally, the consumption and cost of system resources may be effectively reduced by transmitting voice data using a fixed number of channels generated regardless of the scale of the conference.

Furthermore, the voice data of all conference attendees may be efficiently transmitted without degradation in quality by using a small number of channels for terminals that require the creation of channels for each conference attendee's voice data.

It should be noted that the effects of the present disclosure are not limited to those described above, and other effects of the present disclosure will be apparent from the following description.

According to an aspect of the inventive concept, there is a method for transmitting voice data performed by at least one processor. The method may include receiving voice data of a particular speaker from a voice data collection server; determining whether destination terminals are first-type terminals; and based on a determination that the destination terminals are the first-type terminals, transmitting the received voice data to the destination terminals through a channel corresponding to the particular speaker, from among a plurality of predefined channels for the destination terminals.

In some embodiments, a number of the plurality of predefined channels may be greater than a number of voice data collected by the voice data collection server.

In some embodiments, the number of the plurality of predefined channels may be determined based on a number of the destination terminals.

In some embodiments, the method may further include receiving voice data of a plurality of speakers; and based on a determination that the destination terminals are second-type terminals, transmitting the voice data of the plurality of speakers to the destination terminals through a single channel.

In some embodiments, the first-type terminals may be terminals capable of identifying a speaker of first voice data based on a channel through which the first voice data has been received, and the second-type terminals may be terminals capable of identifying a speaker of second voice data by analyzing a source of the second voice data, regardless of a channel through which the second voice data has been received.

In some embodiments, the transmitting the received voice data to the destination terminals may include: determining whether the particular speaker of the received voice data is a new speaker; and based on a determination that the particular speaker of the received voice data is not the new speaker, transmitting the received voice data to the destination terminals through a channel that is previously allocated to previously-received voice data.

In some embodiments, the transmitting the received voice data to the destination terminals may include: determining whether the particular speaker of the received voice data is a new speaker; and based on a determination that the particular speaker of the received voice data is the new speaker, transmitting the received voice data to the destination terminals through a least recently used channel among the plurality of predefined channels.

In some embodiments, the transmitting the received voice data may include: determining whether the particular speaker of the received voice data is a new speaker based on a mapping table between channel identifiers (IDs) and speaker IDs; based on a determination that the particular speaker of the received voice data is the new speaker, replacing a speaker ID in an entry of the mapping table that corresponds to a speaker of oldest voice data with a speaker ID of the new speaker, and transmitting the received voice data to the destination terminals via a channel having a channel ID corresponding to the speaker ID of the new speaker.

In some embodiments, the received voice data may include a predefined number or less of voice data having vocal intensities higher than a reference level, as detected during a measurement period, that are selected, among a plurality of voice data, in a descending order of the vocal intensities.

In some embodiments, the particular speaker may be one of a plurality of speakers, of which respective voice data are received from the voice data collection server, and a number of the plurality of predefined channels may be constant regardless of a number of the plurality of speakers.

According to an aspect of the inventive concept, there is a voice data transmission system. The system may include a voice data collection server configured to select one or more voice data based on periodic utterance quantities of voice data received from user terminals; and a channel control server configured to control one or more channels through which the selected voice data are transmitted to the user terminals, wherein the channel control server is configured to: generate channels for transmitting voice data between the user terminals and the channel control server; identify a type of the user terminals and one or more speakers of the selected voice data, and set one or more channels corresponding to the identified one or more speakers, among the generated channels; and transmit the selected voice data through the set one or more channels.

In some embodiments, the voice data collection server may be configured to analyze vocal intensities of voice data collected from the user terminals and select voice data of a particular speaker based on a result of analysis.

According to an aspect of the inventive concept, there is a voice data transmission apparatus. The apparatus may include: a processor; and a memory configured to store instructions, wherein the instructions, when executed by the processor, cause the processor to: receive voice data of a particular speaker from a voice data collection server; determine whether destination terminals are first-type terminals; and based on a determination that the destination terminals are the first-type terminals, transmit the received voice data to the destination terminals through a channel corresponding to the particular speaker, from among a plurality of predefined channels for the destination terminals.

In some embodiments, a number of the plurality of predefined channels may be greater than a number of voice data collected by the voice data collection server.

In some embodiments, the number of the plurality of predefined channels may be determined based on a number of destination terminals In some embodiments, voice data of a plurality of speakers may be received, and the instructions may further cause the processor to, based on a determination that the destination terminals are second-type terminals, transmit the voice data of the plurality of speakers to the destination terminals through a single channel.

In some embodiments, the first-type terminals may be terminals capable of identifying a speaker of first voice data based on a channel through which the first voice data has been received, and the second-type terminals may be terminals capable of identifying a speaker of second voice data by analyzing a source of the second voice data, regardless of a channel through which the second voice data has been received.

In some embodiments, the instructions may further cause the processor to: determine whether the particular speaker of the received voice data is a new speaker; and based on a determination that the particular speaker of the received voice data is not the new speaker, transmit the received voice data to the destination terminals through a channel that is previously allocated to previously-received voice data.

In some embodiments, the instructions may further cause the processor to: determine whether the particular speaker of the received voice data is a new speaker; and based on a determination that the particular speaker of the received voice data is the new speaker, transmit the received voice data to the destination terminals through a least recently used channel among the plurality of predefined channels.

In some embodiments, the particular speaker may be one of a plurality of speakers, of which respective voice data are received from the voice data collection server, and a number of the plurality of predefined channels may be constant regardless of a number of the plurality of speakers.

BRIEF DESCRIPTION OF THE DRAWINGS

The above and other aspects and features of the present disclosure will become more apparent by describing in detail exemplary embodiments thereof with reference to the attached drawings, in which:

FIG. 8 shows an exemplary index table and an exemplary mapping table that may be referenced in some embodiments of the present disclosure;

5

Figure 10:
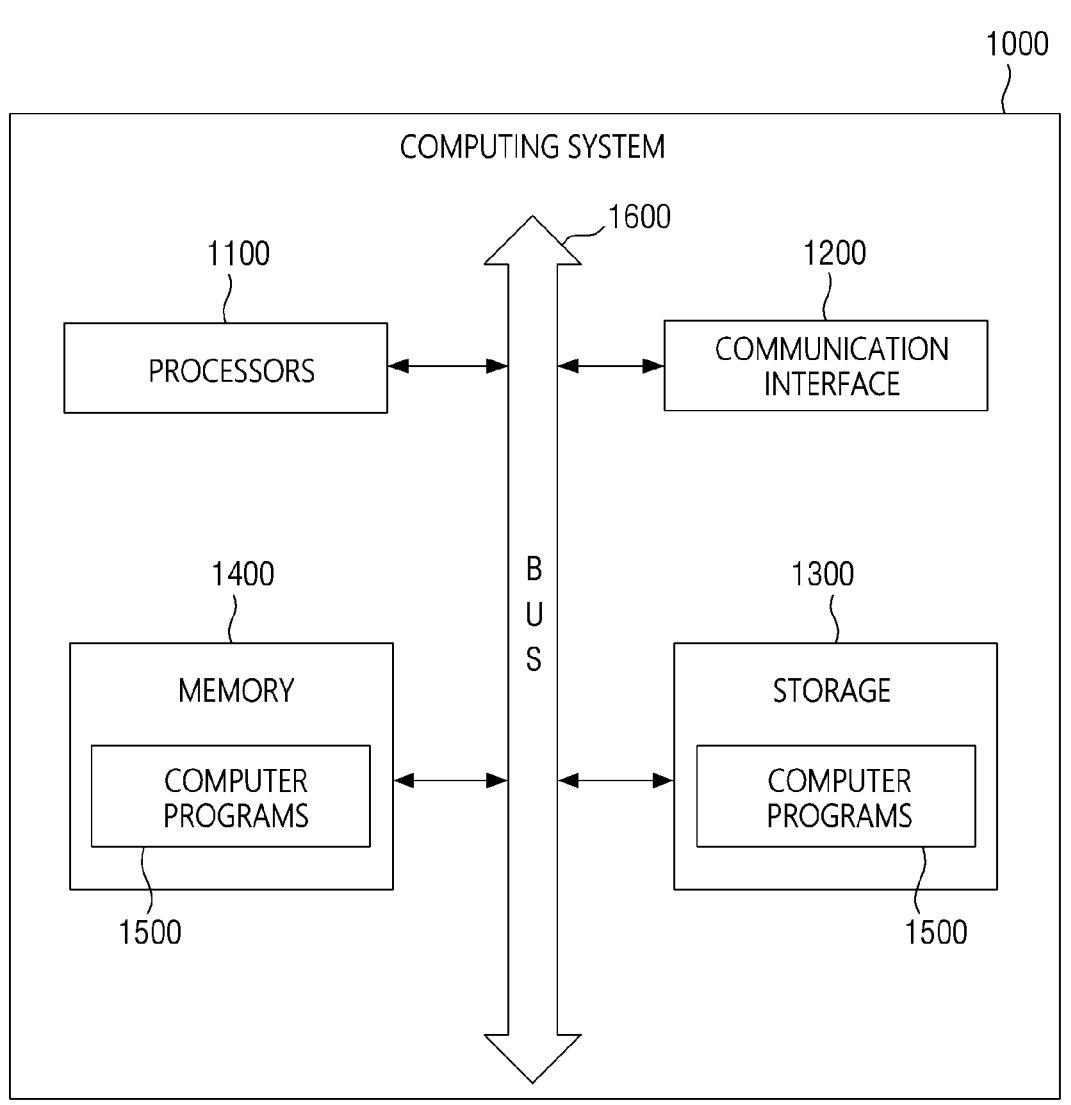

FIG. 10 is a hardware configuration view of a voice data transmission system according to some embodiments of the present disclosure.

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In describing the present disclosure, when it is determined that the detailed description of the related well-known configuration or function may obscure the gist of the present disclosure, the detailed description thereof will be omitted.

Unless otherwise defined, terms used in the following embodiments (including technical and scientific terms) may be used in a meaning that may be commonly understood by those of ordinary skill in the art to which the present disclosure belongs, but this may vary depending on the intention of engineers working in the related field, precedents, and the emergence of new technologies. Terminology used in this disclosure is for describing the embodiments and is not intended to limit the scope of the disclosure.

Expressions in the singular number used in the following embodiments include plural concepts unless the context clearly indicates that the singular number is specified. Also, plural expressions include singular concepts unless clearly specified as plural in context.

In addition, terms such as first, second, A, B, (a), and (b) used in the following embodiments are only used to distinguish certain components from other components, and the terms does not limit the nature, sequence, or order of the components.

Hereinafter, embodiments of the present disclosure are described with reference to the accompanying drawings.

Figure 1:
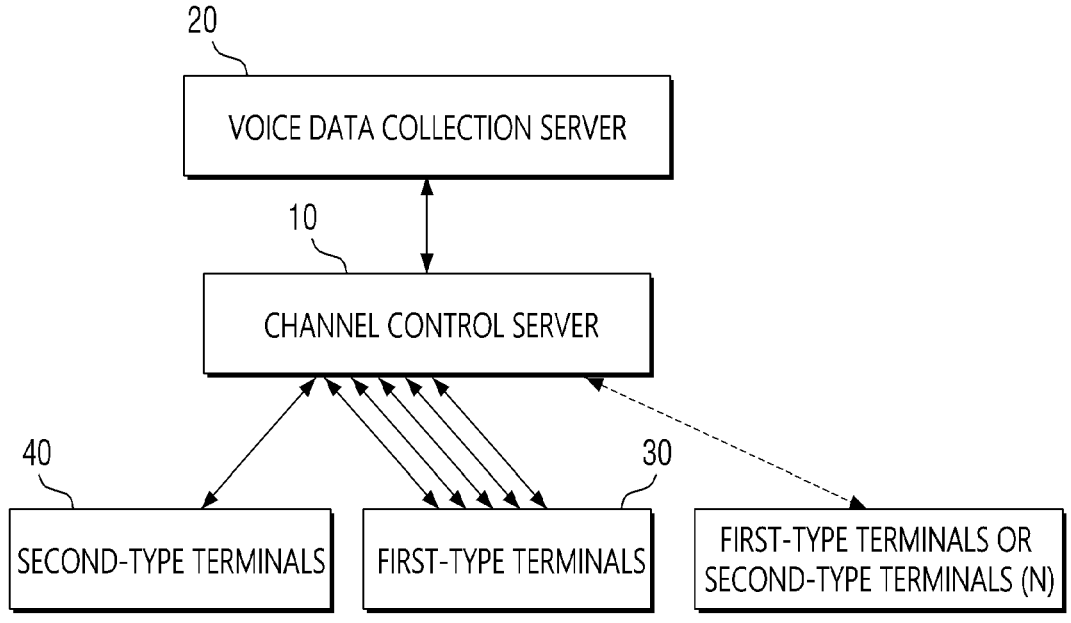
FIG. 1 is a block diagram illustrating an exemplary environment to which a voice data transmission system according to some embodiments of the present disclosure is applicable.

FIG. 1 is a block diagram illustrating an exemplary environment to which a voice data transmission system according to some embodiments of the present disclosure is applicable.

Referring to FIG. 1, the voice data transmission system according to some embodiments of the present disclosure may include a channel control server 10, a voice data collection server 20, and user terminals (30 and 40). The user terminals (30 and 40) may include first-type terminals 30 and second-type terminals 40. For convenience, a voice data transmission method and system according to some embodiments of the present disclosure will hereinafter be described assuming a situation where voice data is transmitted and received in a conference involving multiple speakers. However, it should be noted that the voice data transmission system according to some embodiments of the present disclosure is not limited to the situation set forth herein.

The channel control server 10 may refer to a computing device/system that bidirectionally transmits voice data between the user terminals (30 and 40) and the voice data collection server 20. Furthermore, the channel control server 10 may select channels through which one or more voice data are transmitted to the user terminals (30 and 40), destination terminals, and may perform various operations/functions to improve the transmission environment and quality of voice data. The operations/functions of the channel control server 10 will be described later with reference to FIG. 2.

The voice data collection server 20 may collect voice data of all participants in a particular conference in real time, analyze voice data periodically with large utterance quantities, and transmit the analyzed voice data to the channel control server 10. In this case, since all voice data collected at a particular point in time during the conference do not need to be transmitted to the terminals of the participants (i.e., speakers), an appropriate number of voice data, for example, three voice data, may be selected based on a particular priority in terms of utterance quantity, and only the selected voice data may be transmitted to the terminals of the participants.

In other words, even if voice data of all participants in an online conference is not provided to each participant's terminal, the online conference may still be able to proceed smoothly without problems because when the number of voice data transmitted to each participant's terminal exceeds a predetermined threshold, there tends to be a degradation in the recognition of the voice data of the main speaker. For example, when multiple voice data are played back through a speaker, interference between the voice data may increase, leading to noise being provided to each participant's terminal. Therefore, it may be appropriate to manage the number of voice data delivered to each participant's terminal to be around 3, regardless of the number of participants in the online conference.

The channel control server 10 and the voice data collection server 20 may be implemented by at least one computing device. For example, all the functionalities of each of the channel control server 10 and the voice data collection sever 20 may be implemented by a single computing device. Alternatively, first and second functionalities of each of the channel control server 10 and the voice data collection sever 20 may be implemented by first and second computing devices, respectively. Alternatively, a particular functionality of each of the channel control server 10 and the voice data collection sever 20 may be implemented by multiple computing devices.

Here, the term "computing device" may encompass any device equipped with computing capabilities, and an example of such device is as illustrated in FIG. 10. A computing device, which is an assembly where various components (e.g., memories, processors, etc.) interact, may also be referred to as a "computing system." Also, the term "computing system" may also encompass the concept of a group of multiple computing devices interacting with each other.

The user terminal (30 and 40) may refer to computing devices used by users (i.e., conference participants, speakers) to transmit voice data to the voice data collection server 20 and to receive voice data of other users. The user terminals (30 and 40) may be implemented as various types of computing devices, such as smartphones, desktops, laptops, etc. The user terminals (30 and 40) may be implemented as any suitable devices. Examples of such computing devices are as illustrated in FIG. 10.

The user terminals (30 and 40) may be classified into the first-type terminals 30 and the second-type terminals 40 based on terminal performance, type, or the number of channels required for voice data transmission.

The first-type terminals 30, which are terminals that cannot analyze received voice data to identify the speakers and cannot identify voice data from different channels between them and the channel control server 10 and thus cannot play back the voice data on a speaker-by-speaker basis, may be web-type terminals requiring multiple channels for the transmission of voice data of multiple speakers. For example, in a conference attended by ten speakers, ten separate channels are needed for transmitting voice data of the ten speakers, and the voice data may be played back through the ten channels for the respective speakers.

On the other hand, the second-type terminals 40, which are terminals that may analyze received voice data to identify the speakers and may play back the voice data on a speaker-by-speaker basis, may be application (app)-type terminals requiring only one channel for voice data transmission. That is, even when voice data of multiple speakers are received through a single channel, the received voice data may be played back on a speaker-by-speaker basis.

Devices (10, 20, 30, and 40) that support the voice data transmission method according to some embodiments of the present disclosure have been described so far with reference to FIG. 1. In the description that follows, a detailed explanation of the voice data transmission method according to some embodiments of the present disclosure will be presented with reference to FIG. 2 and the subsequent figures. For convenience, it is assumed that methods/operations that will hereinafter be described are performed in the environment depicted in FIG. 1.

The methods/operations that will hereinafter be described may be performed by a computing device. Here, the computing device may be a server (including virtual machines (VMs), cloud devices, etc.), a desktop, a laptop, or any other device with computing capabilities. An example of such computing device is as illustrated in FIG. 10.

Figure 2:
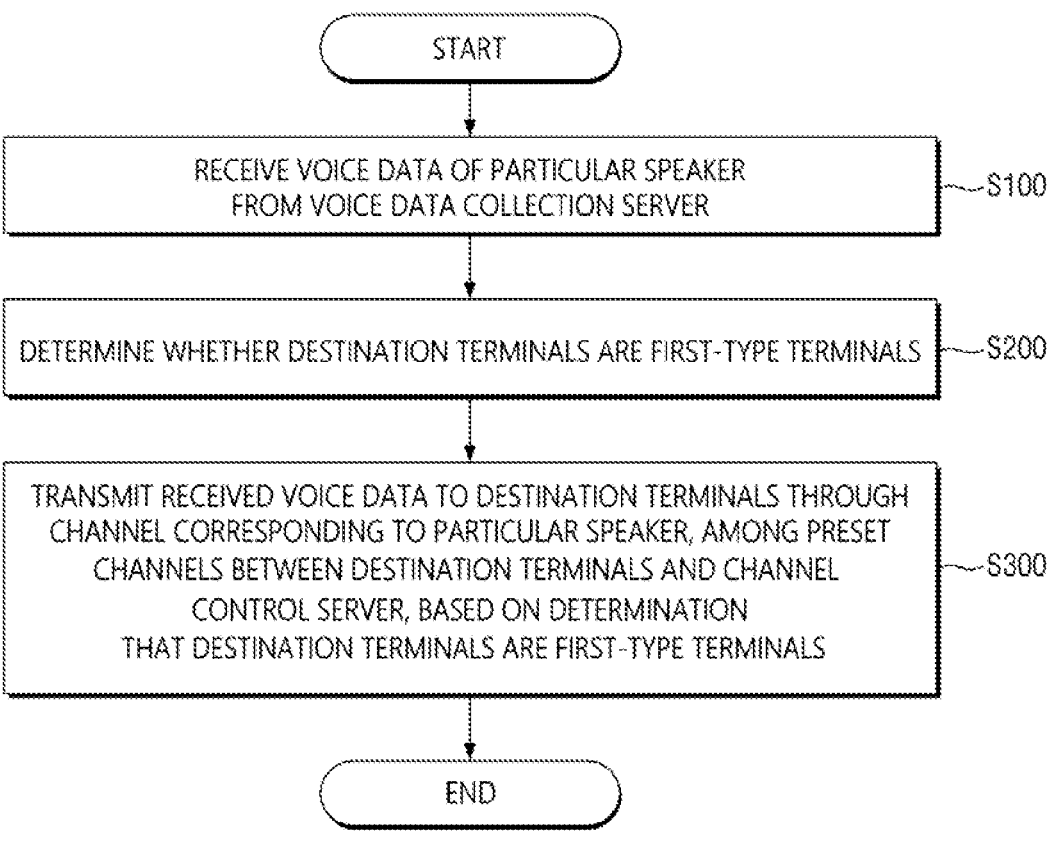
FIG. 2 is a flowchart illustrating a voice data transmission method according to an embodiment of the present disclosure.

FIG. 2 is a flowchart illustrating a voice data transmission method according to an embodiment of the present disclosure. The embodiment of FIG. 2 is merely exemplary, and it should be understood that some steps may be added or deleted as needed.

Referring to FIG. 2, the voice data transmission method according to an embodiment of the present disclosure begins with step S100, which involves receiving, by a channel control server, voice data of a particular speaker from a voice data collection server. The voice data collection server may collect voice data transmitted from one or more terminals, to which the voice of each speaker is input, at intervals of a predetermined measurement period (of, for example, 20 ms). However, the measurement period may vary depending on user requirements or the connectivity environment for various terminals on the conference platform.

Furthermore, the voice data collection server may analyze the collected voice data based on a particular criterion (e.g., vocal intensity), select a predetermined number (e.g., 6) of voice data of the particular speaker based on the results of the analysis, and may transmit the selected voice data to the channel control server.

The criterion for analyzing the collected audio data and the number of selected voice data of the particular speaker are not particularly limited and may vary. For example, the voice data collection server may analyze voice data collected over a particular period, classify the collected voice data according to their vocal intensities, and extract voice data of a speaker with a high vocal intensity.

In other words, sporadic voice data received temporarily by each speaker's terminal (e.g., voice data unrelated to the content of the conference or noise) may compete with voice data of speakers with high vocal intensities based on the logic for determining vocal intensity priorities.

Therefore, the voice data collection server may distinguish sporadic voice data from non-sporadic voice data (i.e., voice data related to the content of a conference), select voice data with a high vocal intensity from the non-sporadic voice data, and transmit the selected voice data to the channel control server.

Furthermore, the voice data collection server may select a predefined number of voice data of speakers with relatively high vocal intensities from among a plurality of voice data. Specifically, one or more channels for transmitting voice data between a plurality of terminals (i.e., destination terminals) and the channel control server may be generated, and a number of voice data less than the number of generated channels may be selected in descending order of vocal intensities.

In one embodiment, the predefined number of channels may be a constant value set in advance by a user. Also, the predefined number of channels may be set to be greater than the number of voice data selected by the voice data collection server based on vocal intensity.

When the number of channels through which voice data is transmitted between the channel control server and multiple terminals is set by the user to N (where N is a natural number), the voice data collection server may analyze the vocal intensities of multiple voice data received from the terminals of 100 speakers participating in a conference and may select a total of N voice data in descending order of the analyzed vocal intensities.

The N channels set by the user may include channels to allow for sporadic voice data that may be collected during the conference. This is to prevent situations where the voice data of existing speakers are not continuously played back due to momentarily lower vocal intensities measured over a particular period than those of sporadic voice data.

In other words, when the number of channels through which voice data is transmitted between the channel control server and the multiple terminals is set to 5 by the user, two of five channels may be for speakers from whom voice data is not continuously received. Therefore, the voice data collection server may analyze the vocal intensities of the multiple voice data received from the terminals of the 100 speakers participating in the conference, select a total of three voice data in descending order of the analyzed vocal intensities, and transmit the selected three voice data through three channels.

In one embodiment, the predefined number of channels may be determined based on the number of terminals participating in the conference.

As the number of participating terminals in the conference grows, the likelihood of sporadic voice data being collected during the course of the conference increases, and thus, additional channels may be needed to accommodate such sporadic voice data. Accordingly, the number of channels reserved for transmitting sporadic voice data may remain constant regardless of the number of speakers participating in the conference and may be adjusted as needed.

The number of voice data selected in descending order of vocal intensities may be set to a constant value regardless of the number of speakers participating in the conference, or may be set to a greater value for a larger number of speakers participating in the conference to enhance the quality of voice data transmission. Consequently, the number of channels generated between the channel control server and the multiple terminals may be set to a greater value for a larger number of participating speakers (or terminals) in the conference.

Referring again to FIG. 2, in step S200, the channel control server may determine whether destination terminals are first-type terminals. Here, the first-type terminals may be terminals capable of identifying the speaker of the received voice data based on the channel through which the voice data has been received.

In step S300, if it is determined that the destination terminals are the first-type terminals, the channel control server may transmit voice data to the destination terminals via a channel corresponding to the particular speaker, among multiple preset channels. A predefined number of preset channels, set by the user, may be generated regardless of the number of speakers participating in the conference. Alternatively, a larger number of channels may be generated for a larger number of speakers participating in the conference, based on the number of participating speakers in the conference. The number of preset channels may be greater than the number of voice data selected by the voice data collection server. Sub-steps of step S300 will be described later with reference to FIG. 4.

Figure 3:
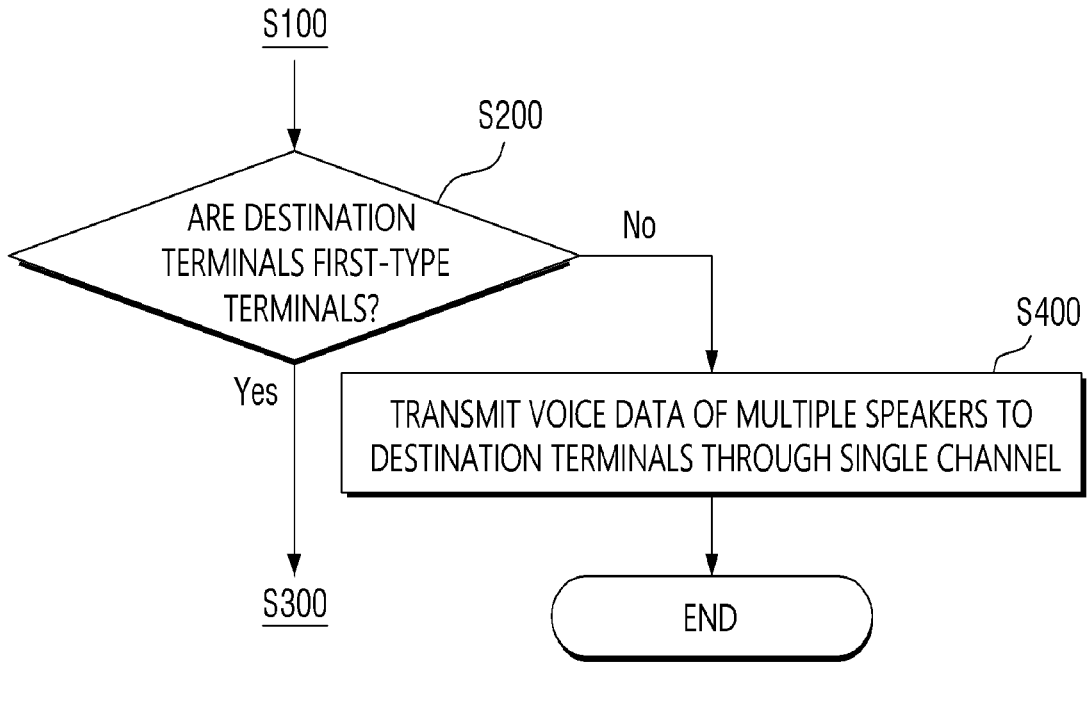
FIG. 3 is a detailed flowchart illustrating some operations depicted in FIG. 2.

FIG. 3 is a detailed flowchart illustrating some operations depicted in FIG. 2. Specifically, FIG. 3 explains the transmission of voice data to second-type destination terminals, as performed when the destination terminals are determined as not being the first-type terminals in step S200 of FIG. 2. Here, the voice data may be the voice data of multiple speakers participating in the conference.

The destination terminals, which may refer to the terminals of the participants of the conference, may be classified into two types: the first-type terminals and the second-type terminals. The first-type terminals are terminal capable of identifying the speaker of received voice data based on the channel through which the voice data has been received, and the second-type terminals are terminals capable of analyzing received voice data and thereby identifying the speaker of the received voice data, regardless of the channel through the voice data has been received.

Referring to FIG. 3, when the channel control server determines in step S200 that the destination terminals are the first-type terminals, step S300 may be performed. If the destination terminals are determined as not being the first-type terminals but being the second-type terminals, step S400, which involves transmitting the voice data of multiple speakers to the destination terminals through a single channel, may be performed.

Thus, when the destination terminals are the second-type terminals, which are capable of analyzing and identifying the speaker of received voice data from the channel control server and playing back voice data for each identified speaker, the voice data may be properly played back for each speaker without issues such as degradation in the quality of voice data even if the voice data is received via a single channel.

On the other hand, if the destination terminals are the first-type terminals, the channel control server may require the channel control server to determine which channel, among the multiple preset channels, needs to be used to transmit the voice data to the destination terminals, in consideration that the first-type terminals may identify the speaker of received voice data based on the channel through which the corresponding voice data has been received. A method of determining a channel through which the voice data of the particular speaker is to be transmitted to the destination terminals will hereinafter be described with reference to FIG. 4.

Figure 4:
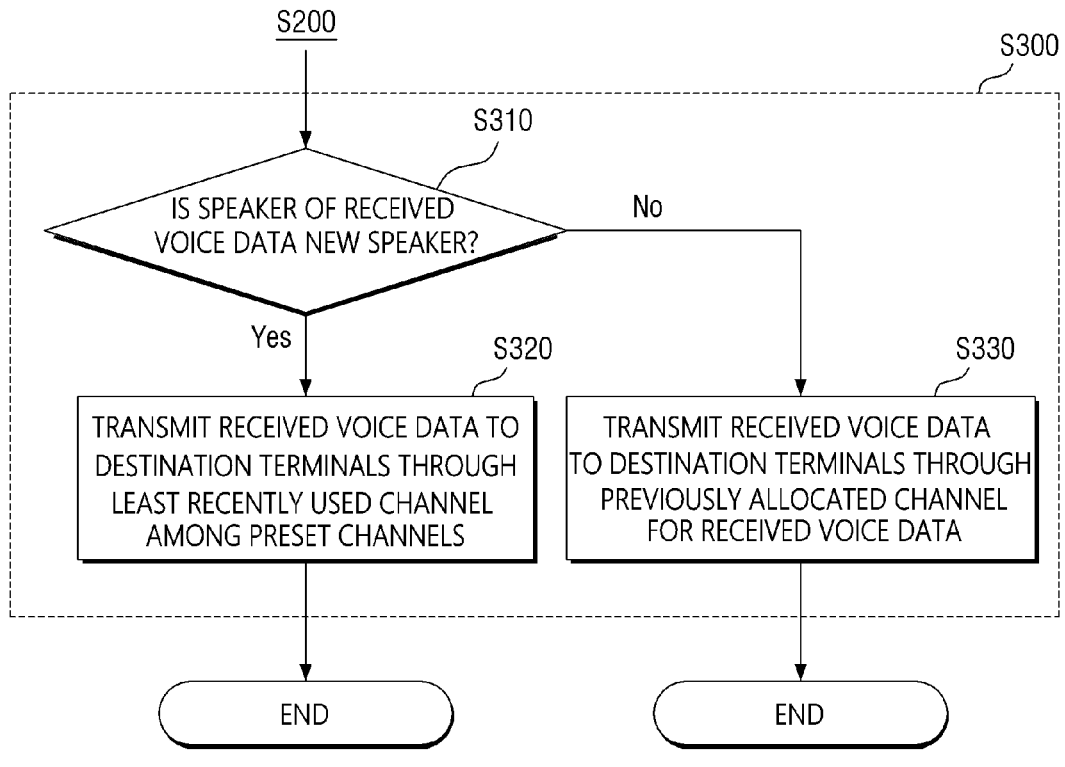
FIG. 4 is a detailed flowchart illustrating some operations depicted in FIG. 2.

FIG. 4 is a detailed flowchart illustrating some operations depicted in FIG. 2. The embodiment of FIG. 4 is merely exemplary, and it should be understood that some steps may be added or deleted as needed.

Referring to FIG. 4, step S300, which is a step where the channel control server transmits voice data to the first-type destination terminals, may include: determining whether the speaker of the received voice data is a new speaker (S310), transmitting the received voice data to the destination terminals through a least recently used channel among the multiple preset channels (S320) if the speaker of the received voice data is determined to be a new speaker; and transmitting the received voice data to the destination terminals through a channel corresponding to the received voice data (S330) if the speaker of the received voice data is not determined to be a new speaker.

Here, the least recently used channel among the multiple preset channels may be selected based on timestamp values that are updated whenever the respective preset channels transmit voice data to the destination terminals. In other words, a preset channel with a largest timestamp value may be selected as a channel through which the received voice data is to be transmitted to the destination terminals.

At an initial stage of the transmission of voice data in an online conference, voice data may be transmitted to the destination terminals through a channel that has not been used for voice data transmission among the multiple preset channels between the destination terminals and the channel control server. For example, in an online conference attended by 50 people (e.g., speakers 1 through 50), six channels (e.g., channels A through F) may be created between the destination terminals and the channel control server. If speakers 1, 2, and 3 sequentially speak at the initial stage of the online conference, speaker 1's voice data may be transmitted to the destination terminals through channel A, speaker 2's voice data may be transmitted to the destination terminals through channel B, and speaker 3's voice data may be transmitted to the destination terminals through channel C.

However, if new voice data, i.e., third voice data, is transmitted to the channel control server when the multiple preset channels are all currently in use, the channel control server needs to decide through which channel among the multiple preset channels the third voice data is to be transmitted. In this regard, if the speaker of the third voice data is not a new speaker but an existing speaker, the third voice data may be transmitted to the destination terminals through a channel corresponding to the existing speaker. Alternatively, if the speaker of the third voice data is a new speaker, one of the multiple preset channels may be selected, and the third voice data may be transmitted to the destination terminals through the selected channel. For example, the least recently used channel among the multiple preset channels may be selected as a channel for transmitting the third voice data.

In other words, if the channel control server receives new voice data (i.e., the third voice data) when channels A through F are all in use for voice data transmission, the channel control server may determine whether the speaker of the third voice data is a new speaker (i.e., whether or not the speaker of the third voice data is one of speakers 1 through 3). If the speaker of the third voice data is speaker 1, the third voice data may be transmitted to the destination terminals through channel A. On the other hand, if the speaker of the third voice data is speaker 50, the third voice data may be transmitted to the destination terminals through channel C, which is the least recently used among channels A to F.

Meanwhile, the criterion for selecting a particular channel (i.e., the least recently used channel) from among the multiple preset channels is not particularly limited, and any particular channel may be selected based on various other criteria.

Figure 5:
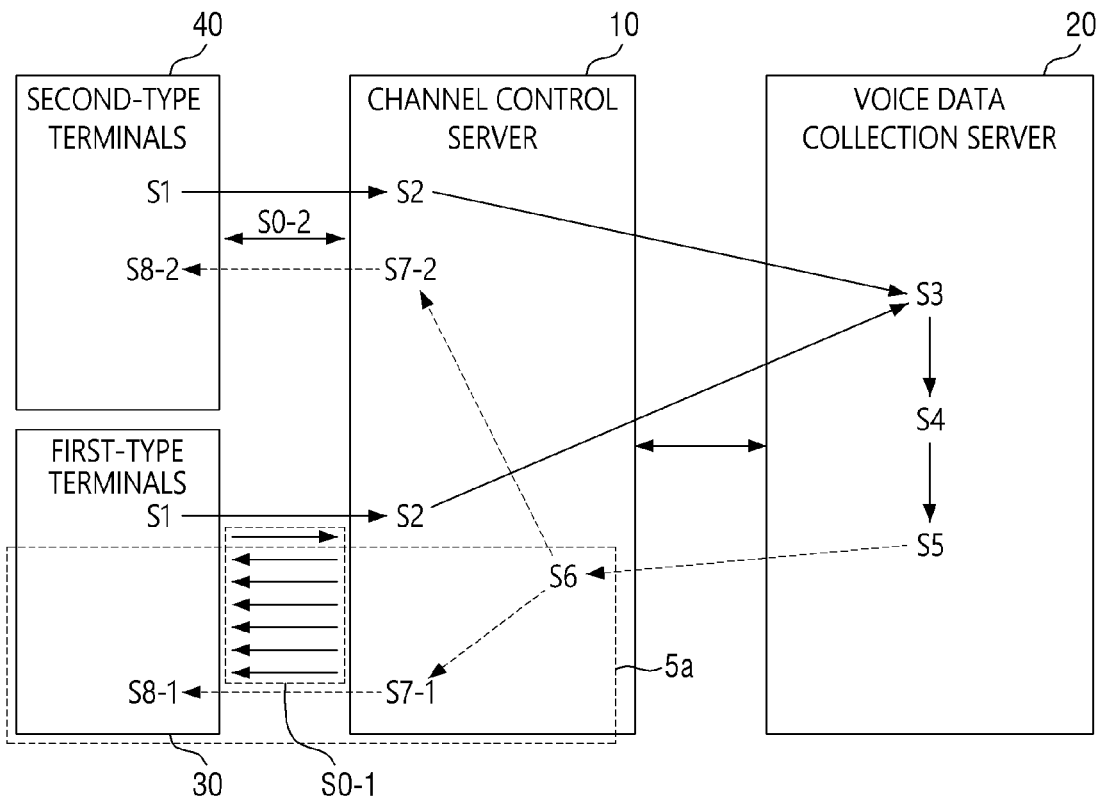
FIG. 5 is a schematic view illustrating the transmission of voice data that may be referenced in some embodiments of the present disclosure.

FIG. 5 is a schematic view illustrating the transmission of voice data that may be referenced in some embodiments of the present disclosure. Specifically, FIG. 5 depicts the process of transmitting voice data to different types of terminals.

Referring to FIG. 5, a channel through which voice data may be transmitted bidirectionally may be established between a second-type terminal 40 and the channel control server 10 (S0-2). Also, a total of m+1 channels, including one channel for transmitting voice data input to a first-type terminal 30 to the channel control server 10 and m channels for receiving voice data transmitted by the channel control server 10, may be established between the first-type terminal 30 and the channel control server 10 (S0-1). Here, m may represent the number of channels preset according to a particular criterion. The criterion for determining the number of preset channels is as already described above with reference to FIGS. 1 and 2, and thus, a detailed description thereof will be omitted.

Meanwhile, to establish one or more channels between the first- and second-type terminals 30 and 40 and the channel control server 10, tables (e.g., an index table and a mapping table) may be created for controlling voice data for channels corresponding to the transmission paths for multiple voice data. This will be described later with reference to FIGS. 7 through 9.

Referring back to FIG. 5, speakers participating in the conference may turn on the microphones of their terminals and speak, and voice data related to their utterances may be transmitted to the channel control server 10 (S1). The channel control server 10 may transmit the voice data to the voice data collection server 20 (S2).

Thereafter, the voice data collection server 20 may collect voice data transmitted by the channel control server 10 at intervals of a predefined measurement period (of, for example, 20 ms) (S3), and may sort and arrange the collected voice data based on a particular criterion or priority such as vocal intensity, and may select three or four voice data with highest speech intensities (S4). Furthermore, the voice data collection server 20 may transmit a certain number of selected voice data to the channel control server 10 (S5). The measurement period, the predefined criterion, and the certain number of selected voice data are not particularly limited and may vary.

Thereafter, the channel control server 10 may determine the type of the destination terminals for the voice data received from the voice data collection server 20 (S6). If the destination terminals are the second-type terminals 40, the channel control server 10 may transmit the received voice data to the second-type terminals 40 without performing any additional process (S7-2), and the second-type terminals 40 may segregate and play back the received voice data by speaker.

On the other hand, if the destination terminals are the first-type terminals 30, the channel control server 10 may perform an additional process 5a. Specifically, the channel control server 10 may identify the speakers of the received voice data and may transmit the received voice data to the first-type terminals 30 through a channel corresponding to each identified speaker based on the results of the identification (S7-1). Thereafter, the first-type terminals 30 may play back voice data received through each channel as it is. Further details on this process will hereinafter be presented with reference to FIGS. 6 through 9.

Figure 6:
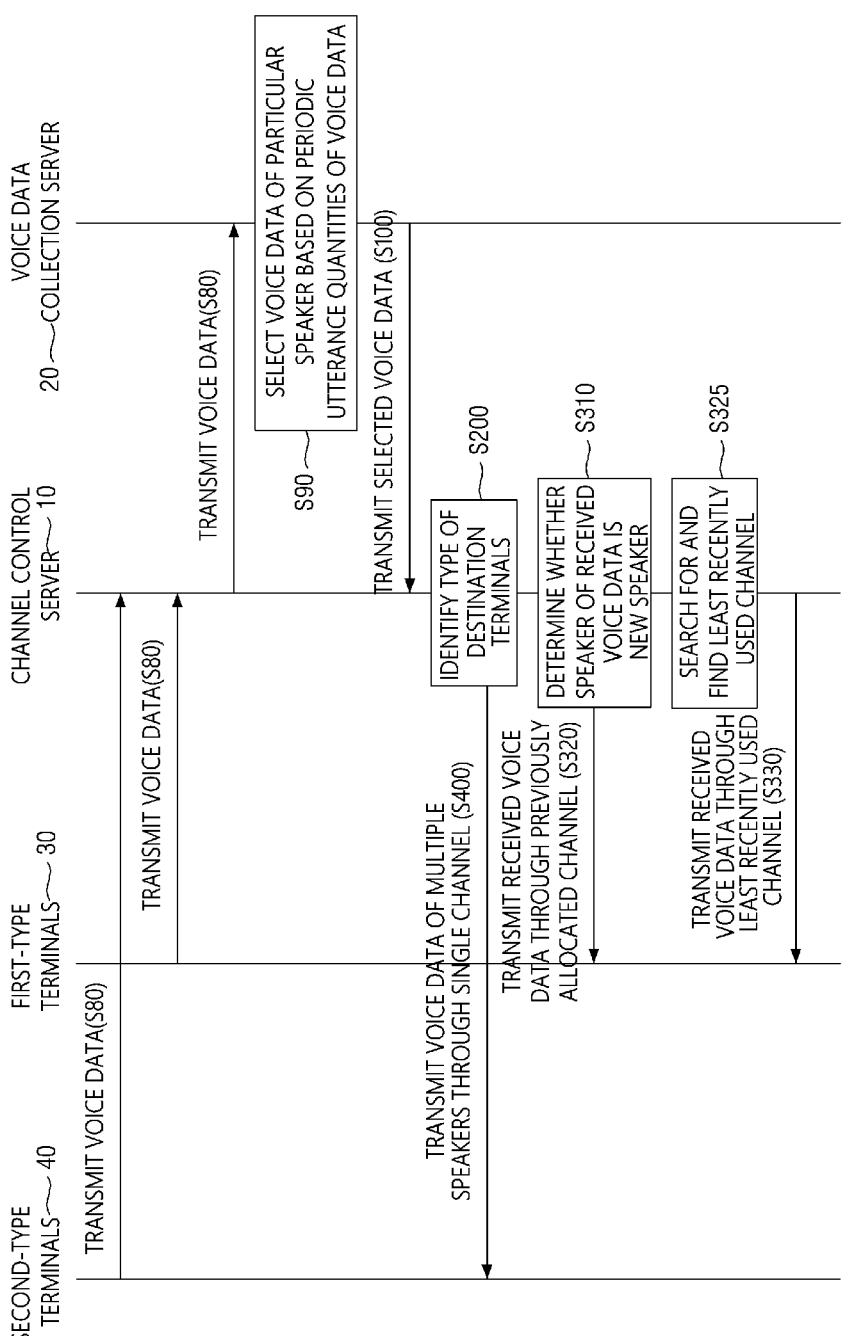
FIG. 6 is a signal flowchart illustrating the voice data transmission method of FIGS. 2 through 5.

FIG. 6 is a signal flow diagram illustrating the voice data transmission method of FIGS. 2 through 5. The embodiment of FIG. 6 is merely exemplary, and it should be understood that some steps may be added or deleted as needed. The voice data transmission method of FIGS. 2 through 5 may be more clearly understood from FIG. 6.

Referring to FIG. 6, in step S80, the first-type terminals 30 and the second-type terminals 40 may transmit voice data to the channel control server 10, and the channel control server 10 may transmit the voice data to the voice data collection server 20. In step S90, the voice data collection server 20 may select a predefined number of voice data of a particular specific speaker based on the periodic utterance quantities of the received voice data. Here, the predefined number of selected voice data of the particular speaker may preferably be set to 3 or 4, but the present disclosure is not limited thereto. Thereafter, in step S100, the voice data collection server 20 may transmit the voice data that has been selected in step S90 to the channel control server 10.

Thereafter, in step S200, the channel control server 10 may identify the type of destination terminals to which the voice data received from the voice data collection server 20 is to be transmitted. In step S400, if the destination terminals are the second-type terminals 40, voice data of multiple speakers may be transmitted between the second-type terminals 40 and the channel control server 10 through a single preset channel. Here, the single preset channel may be a channel through which voice data may be bidirectionally transmitted.

On the other hand, in step S310, if the destination terminals are determined in step S200 to be the first-type terminals 30, the channel control server 10 may determine whether the speaker of voice data to be transmitted to the first-type terminals 30 is a new speaker. At this time, a determination may be made as to whether the speaker of the voice data to be transmitted to the first-type terminals 30 is a new speaker by comparing the speaker of the corresponding voice data with the speakers corresponding to channels currently being in use. Specifically, as will be described later, information present in a mapping table and an index table may be used to determine whether the speaker of the voice data to be transmitted to the first-type terminals 30 is a new speaker.

In step S320, if it is determined that the speaker of the voice data to be transmitted to the first-type terminals 30 is not a new speaker, the channel control server 10 may transmit the corresponding voice data through a channel that has already been allocated to the speaker of the corresponding voice data. Here, the previously allocated channel may refer to a channel through which other voice data (i.e., previously-received voice data) of the same speaker has been transmitted.

Conversely, in step S325, if the speaker of the voice data to be transmitted to the first-type terminals 30 is determined to be a new speaker, the channel control server 10 may find a least recently used channel among the multiple preset channels and may transmit the corresponding voice data to the first-type terminals 30 through the found least recently used channel. However, a method for selecting a channel for transmitting voice data of a new speaker from among the multiple preset channels is not particularly limited and may vary without compromising the environment for voice data transmission (e.g., transmission speed or quality).

The selection of the least recently used channel among the multiple preset channels will hereinafter be described with reference to FIGS. 7 through 9.

Figure 7:
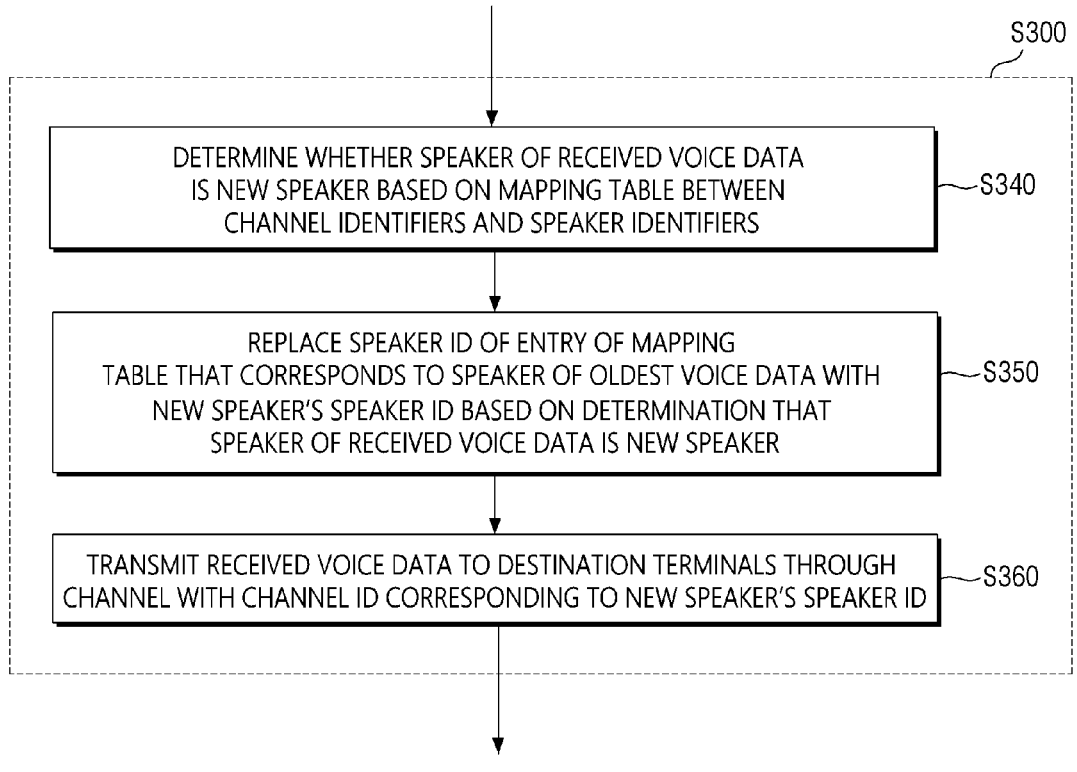
FIG. 7 is a detailed flowchart illustrating some operations depicted in FIG. 2.

FIG. 7 is a detailed flowchart illustrating some operations depicted in FIG. 2. The embodiment of FIG. 7 is merely exemplary, and it should be understood that some steps may be added or deleted as needed.

Referring to FIG. 7, step S300, which is for transmitting the received voice data to the destination terminals through a channel corresponding to the particular speaker, may include: determining whether the speaker of the received voice data is a new speaker (S340) based on a mapping table between channel identifiers (IDs) and speaker IDs; if it is determined that the speaker of the received voice data is a new speaker, replacing a speaker ID in an entry of the mapping table that corresponds to the speaker of oldest voice data with the new speaker's speaker ID (S350); and transmitting the received voice data to the destination terminals (i.e., the first-type terminals) through a channel corresponding to the new speaker's speaker ID (S360).

Here, the channel IDs may be identifiers for distinguishing the multiple channels established between the destination terminals and the channel control server, and the speaker IDs may be identifiers for distinguishing the multiple attendees participating in the conference.

In other words, the channel control server may generate a mapping table containing the channel IDs and the respective speaker IDs and may determine whether the speaker of the received voice data is a speaker whose speaker ID is present in the mapping table. If the speaker of the received voice data is determined to be a new speaker, the channel control server may identify the channel ID of the channel through which the oldest voice data has been transmitted from among the entries of the mapping table and may replace the corresponding speaker ID with the new speaker's speaker ID. Thereafter, the voice data may be transmitted to the destination terminals through the channel corresponding to the new speaker's speaker ID.

The selection of a channel for transmitting voice data using a mapping table and an index table will hereinafter be described with reference to FIGS. 8 and 9.

Figure 9:
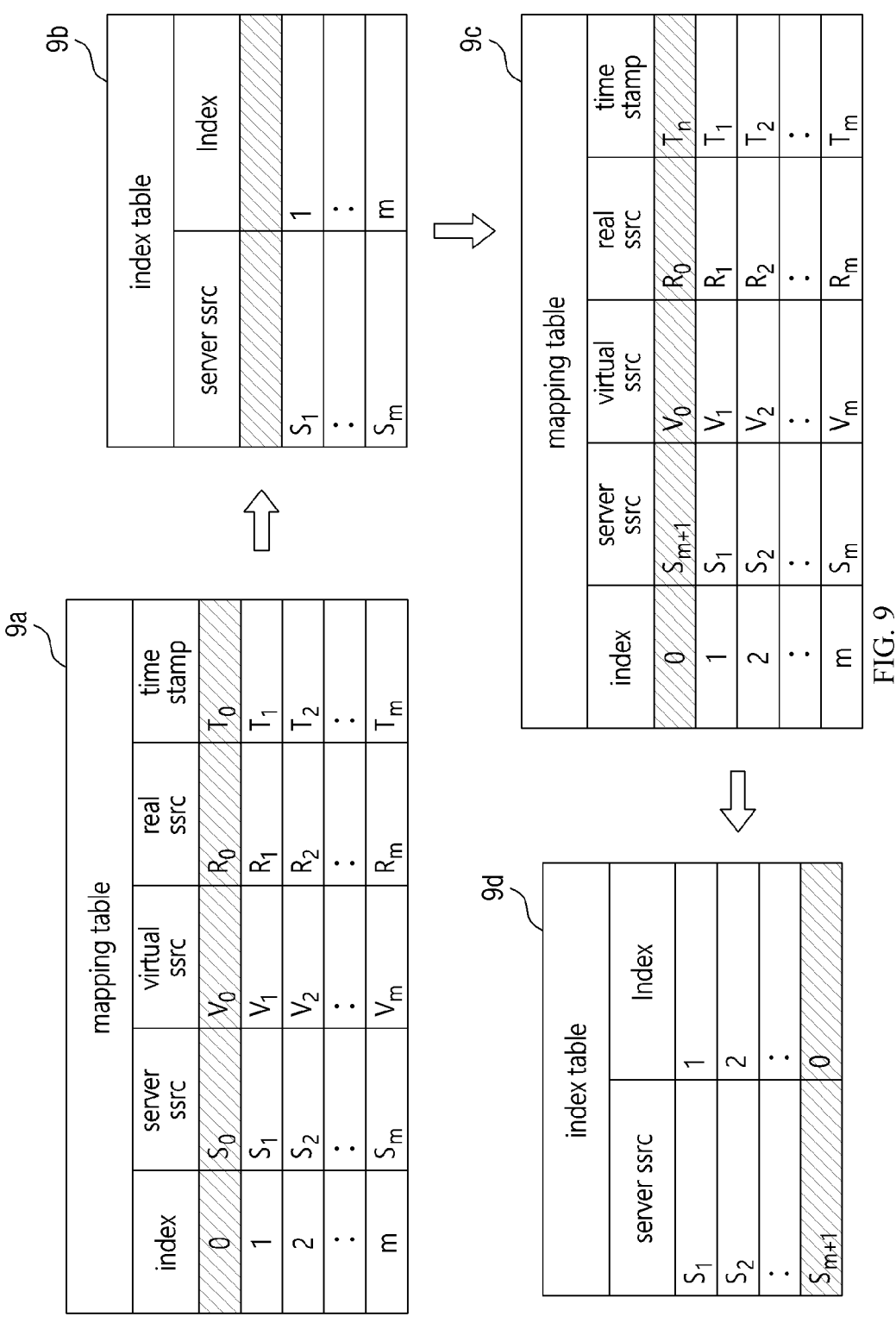
FIG. 9 depicts some operations depicted in FIG. 7.

FIG. 8 shows an exemplary index table 8a and an exemplary mapping table 8b that may be referenced in some embodiments of the present disclosure, and FIG. 9 depicts some operations depicted in FIG. 7.

In some embodiments, the channel control server may include a channel generation unit, which generates channels for voice data transmission between terminals and the channel control server at an early stage of a conference or before the start of the conference, a channel setting unit, which identifies the speaker and the destination terminals of received voice data during the conference and sets a channel corresponding to the identified speaker, and a voice data transmission unit, which transmits voice data to the destination terminals through the set channel.

The channel creation unit may generate m channels (where m is a natural number) for handling voice data transmission and reception during the conference at an initial stage when the conference begins (e.g., before the transmission or reception of voice data). A first identifier "virtual ssrc," which is used to identify each channel, may be set to a range of values that are not normally created or allocated to prevent any overlap with one another. The value of the first identifier "virtual ssrc" may be used when exchanging channel information for voice data to be opened between a speaker's terminal and the channel control server, may be shared in advance between the speaker's terminal and the channel control server, and may represent a channel to be opened for voice data transmission. Since the first identifier "virtual ssrc" is not used after the channel is opened, the first identifier "virtual ssrc" may be distinguished from a channel identifier "real ssrc" that will be described later, in that it is not used at the actual time of voice data transmission.

Meanwhile, the mapping table 8b may include not only first identifier ("virtual ssrc") values, but also second identifier ("server ssrc") values, which are used to identify voice data transmitted from the voice data collection server, channel identifier ("real ssrc") values assigned at the times of creation of channels, and timestamp values that contain information regarding the times of transmission of the voice data. Here, the times of transmission of the voice data may be either the times the voice data are received from the voice data server or the times the voice data are transmitted to the destination terminals. Also, the channel identifier values may be assigned when preparing channels for transmitting the voice data and may not change while the channels are maintained. Furthermore, the speaker's terminal and the channel control server may identify the voice data based on the channel identifier values.

Additionally, as depicted in FIG. 8, the index table 8a may be a table where the second identifier ("server ssrc") values and indexes from 0 to m (where m is a natural number) are mapped. These (m+1) indexes may be understood to represent one channel for transmitting voice data from the speakers' terminals (i.e., the destination terminals) to the channel control server and m preset channels for transmitting voice data from the channel control server to the destination terminals.

Referring to FIG. 9, if the speaker of given voice data is determined to be a new speaker based on a mapping table 9a between channel IDs and speaker IDs, a channel corresponding to a highest timestamp value may be searched for and found from among the entries of the mapping table 9a. That is, a channel with a highest timestamp value $T_0$ (i.e., a channel with a channel ID ("real ssrc") value $S_0$) may be found.

Subsequently, as shown in FIG. 9, the second identifier ("server ssrc") and index for the found channel may be deleted from an index table 9b, and the mapping table 9a may be updated to include information for the voice data of the new speaker. Specifically, a second identifier ("server ssrc") value $S_0$ and the timestamp value $T_0$ for the found channel may be deleted from the mapping table 9a, and the corresponding entry of the mapping table 9a may be updated with information for the new speaker's voice data (e.g., a speaker ID ("server ssrc") value $S_{m+1}$, a channel ID ("real ssrc") value $R_0$, and a timestamp value $T_n$), thereby obtaining a new mapping table 9c. Subsequently, the index table 9b may be updated into an index table 9d to reflect the information for the new speaker's voice data.

In other words, the speaker ID ("server ssrc") value of the speaker of oldest voice data, i.e., $S_0$, may be replaced with the speaker ID ("server ssrc") value of the new speaker, i.e., $S_{m+1}$, in the entry of the mapping table 9a that corresponds to the oldest voice data, and the new speaker's voice data may be transmitted to the destination terminals through a channel with a channel ID value corresponding to the speaker ID value of the new speaker.

The effects of the voice data transmission system according to some embodiments of the present disclosure compared to a conventional voice data transmission system will hereinafter be described, focusing on channel maintenance and management, as well as channel creation and deletion event handling in response to microphone on/off events at each terminal in an online conference with 100 participating speakers. Meanwhile, Tables 1 and 2 below show the results derived based on the assumption that the terminals of the 100 speakers are web-type first-type terminals and the number of preset channels between the channel control server and each of the 100 speakers is 6.

TABLE 1

| Conference Size | Channel Resource Occupancy | Conventional | Present Disclosure | Reduction |
|---|---|---|---|---|
| 100 | Each terminal | 100 | 7 | 93% |
| | Channel Control Server | 10,000 | 700 | 93% |
| 1,000 | Each terminal | 1,000 | 7 | 99.3% |
| | Channel Control Server | 1,000,000 | 700 | 99.3% |

Referring to Table 1 above, when there are 100 conference participants, the conventional voice data transmission system may set 100 channels in each terminal and may set, in the channel control server, a total of 10,000 channels, calculated by the number of connected terminals, 100, by the number of channels set in each terminal in the channel control server, 100. On the other hand, the voice data transmission system according to some embodiments of the present disclosure may set a total of 7 channels, including one channel for transmitting voice data toward the channel control server and six channels for receiving voice data from the channel control server, in each terminal and may set, in the channel control server, a total of 700 channels, calculated by multiplying the number of connected terminals, 100, by the number of channels set in each terminal, 7. Therefore, according to some embodiments of the present disclosure, resource consumption may be reduced by 93% compared to the conventional voice data transmission system.

Meanwhile, when there are 1,000 conference participants, the conventional voice data transmission system may set 1,000 channels in each terminal and may set, in the channel control server, a total of 1,000,000 channels, calculated by multiplying the number of connected terminals, 1,000, by the number of channels set in each terminal, 1,000. On the other hand, the voice data transmission system according to some embodiments of the present disclosure may set a total of 7 channels, including one channel for transmitting voice data to the channel control server and six channels for receiving voice data from the channel control server, in each terminal and may set, in the channel control server, a total of 7,000 channels, calculated by multiplying the number of connected terminals, 1,000, by the number of channels set in each terminal, i.e., 7. Therefore, according to some embodiments of the present disclosure, resource consumption may be reduced by 99.3% compared to the conventional voice data transmission system.

Consequently, since the number of channels may be fixed regardless of an increase in the size of the conference (i.e., the number of conference participants) and a fixed number of channels may be generated and maintained, the consumption of resources may be effectively reduced and managed. The resource-saving effect of the present disclosure compared to the conventional voice data transmission system may be further enhanced as the number of meeting participants increases.

Table 2 below describes the cost-reduction effect of handling channel generation and deletion events accompanied by turning on and off the microphone of the terminal of each conference participant.

TABLE 2

| Conference Size | Microphone On/ Off Events | Conventional | Present Disclosure | Reduction |
|---|---|---|---|---|
| 100 | Each terminal | 200 | 8 | 96% |
| | Channel Control Server | 200000 | 800 | 96% |
| 1,000 | Each terminal | 2000 | 8 | 99.6% |
| | Channel Control Server | 2000000 | 800 | 99.6% |

As shown in Table 2 above, when there are 100 conference participants, the conventional voice data transmission system may handle, for each terminal, 200 events (i.e., channel generations/deletions), calculated by multiplying the number of microphone on/off events, i.e., 2, by the number of participants, 100, and may set, in the channel control server, a total of 20,000 channels, calculated by multiplying the number of connected terminals, 100, the number of channels set in each terminal, 100, and the number of events, 2. On the other hand, the voice data transmission system according to some embodiments of the present disclosure may handle, for each terminal, a total of 8 events, including two events (i.e., microphone on/off events) for transmitting voice data to the channel control server and six events for receiving voice data from the channel control server, and may handle, for the channel control server, a total of 800 events, calculated by multiplying the number of connected terminals, 100, by the number of events per terminal, 8. Therefore, according to some embodiments of the present disclosure, event processing costs may be reduced by 96% compared to the conventional voice data transmission system.

Meanwhile, when there are 1,000 conference participants, the conventional voice data transmission system may handle, for each terminal, 2,000 events (i.e., channel generations/deletions), calculated by multiplying the number of microphone on/off events, 2, by the number of participants, 1,000, and may set, in the channel control server, a total of 2,000,000 channels, calculated by multiplying the number of connected terminals, 1,000, the number of channels set in each terminal, 1,000, and the number of events, 2. On the other hand, the voice data transmission system according to some embodiments of the present disclosure may handle, for each terminal, a total of 8 events, including two events (i.e., microphone on/off events) for transmitting voice data to the channel control server and six events for receiving voice data from the channel control server, and may handle, for the channel control server, a total of 8,000 events, calculated by multiplying the number of connected terminals, 1,000, by the number of events per terminal, 8. Therefore, according to some embodiments of the present disclosure, event processing costs may be reduced by up to 99.6% compared to the conventional voice data transmission system.

Consequently, since the number of events to be processed per terminal may be fixed regardless of an increase in the size of the conference (i.e., the number of conference participants) and a fixed number of events may be handled, event processing costs may be effectively reduced. The cost reduction effect of the present disclosure may be further enhanced as the number of conference participants increases.

FIG. 10 is a hardware configuration view of a voice data transmission system according to some embodiments of the present disclosure. Referring to FIG. 10, a voice data transmission system 1000 may include one or more processors 1100, a system bus 1600, a communication interface 1200, a memory 1400, which loads computer programs 1500 executed by the processors 1100, and a storage 1300, which stores the computer programs 1500.

The processors 1100 control the overall operations of the components of the voice data transmission system 1000. The processors 1100 may perform computations for at least one application or program to execute methods/operations according to various embodiments of the present disclosure. The memory 1400 stores various data, commands, and/or information. The memory 1400 may load one or more computer programs 1500 from the storage 1300 to execute the methods/operations according to various embodiments of the present disclosure. The system bus 1600 provides communication functions between the components of the voice data transmission system 1000. The communication interface 1200 supports Internet communication of the voice data transmission system 1000. The storage 1300 may temporarily store one or more computer programs 1500. The computer program 1500 may include one or more instructions that implement the methods/operations according to various embodiments of the present disclosure. When the computer programs 1500 are loaded into the memory 1400, the processors 1100 may execute the aforementioned one or more instructions to perform the methods/operations according to various embodiments of the present disclosure.

In some embodiments, referring to FIG. 10, the voice data transmission system 1000 may be configured using one or more physical servers included in a server farm, based on cloud technology such as VMs. In this case, at least some of the components depicted in FIG. 10, such as the processors 1100, the memory 1400, and the storage 1300, may be implemented as virtual hardware, and the communication interface 1200 may also be implemented as a virtualized networking element such as a virtual switch.

Embodiments of the present disclosure have been described above with reference to FIGS. 1 through 10, but it should be noted that the effects of the present disclosure are not limited to those described above, and other effects of the present disclosure should be apparent from the following description.

The technical features of the present disclosure described so far may be embodied as computer readable codes on a computer readable medium. The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

The protection scope of the present invention should be interpreted by the following claims, and all technical ideas within the equivalent range should be interpreted as being included in the scope of the technical ideas defined by the present disclosure.

What is claimed is:

1. A voice data transmission method performed by at least one processor, comprising:

receiving voice data of a plurality of speakers including voice data of a particular speaker from a voice data collection server;

determining whether destination terminals are first-type terminals; and based on a determination that the destination terminals are the first-type terminals, transmitting the received voice data to the destination terminals through a channel corresponding to the particular speaker, from among a plurality of predefined channels for the destination terminals wherein the transmitting the received voice data to the destination terminals further comprises:

based on a determination that the destination terminals are second-type terminals, transmitting the voice data of the plurality of speakers to the destination terminals through a single channel, wherein the first-type terminals are terminals capable of identifying a speaker of first voice data based on a channel through which the first voice data has been received, and wherein the second-type terminals are terminals capable of identifying a speaker of second voice data by analyzing a source of the second voice data, regardless of a channel through which the second voice data has been received.

2. The voice data transmission method of claim 1, wherein a number of the plurality of predefined channels is greater than a number of voice data collected by the voice data collection server.

3. The voice data transmission method of claim 2, wherein the number of the plurality of predefined channels is determined based on a number of the destination terminals.

4. The voice data transmission method of claim 1, wherein the transmitting the received voice data to the destination terminals comprises:

determining whether the particular speaker of the received voice data is a new speaker; and based on a determination that the particular speaker of the received voice data is not the new speaker, transmitting the received voice data to the destination terminals through a channel that is previously allocated to previously-received voice data.

5. The voice data transmission method of claim 1, wherein the transmitting the received voice data to the destination terminals comprises:

determining whether the particular speaker of the received voice data is a new speaker; and based on a determination that the particular speaker of the received voice data is the new speaker, transmitting the received voice data to the destination terminals through a least recently used channel among the plurality of predefined channels.

6. The voice data transmission method of claim 1, wherein the transmitting the received voice data comprises:

determining whether the particular speaker of the received voice data is a new speaker based on a mapping table between channel identifiers (IDs) and speaker IDs;

based on a determination that the particular speaker of the received voice data is the new speaker, replacing a speaker ID in an entry of the mapping table that corresponds to a speaker of oldest voice data with a speaker ID of the new speaker, and transmitting the received voice data to the destination terminals via a channel having a channel ID corresponding to the speaker ID of the new speaker.

7. The voice data transmission method of claim 1, wherein the received voice data includes a predefined number or less of voice data having vocal intensities higher than a reference level, as detected during a measurement period, that are selected, among a plurality of voice data, in a descending order of the vocal intensities.

8. The voice data transmission method of claim 1, wherein the particular speaker is one of a plurality of speakers, of which respective voice data are received from the voice data collection server, and a number of the plurality of predefined channels is constant regardless of a number of the plurality of speakers.

9. A voice data transmission system, comprising:

a voice data collection server configured to select one or more voice data based on periodic utterance quantities of voice data received from user terminals; and a channel control server configured to control one or more channels through which the selected voice data are transmitted to the user terminals, wherein the channel control server is configured to:

generate channels for transmitting voice data between the user terminals and the channel control server;

identify a type of the user terminals and one or more speakers of the selected voice data, and set one or more channels corresponding to the identified one or more speakers, among the generated channels; and transmit the selected voice data through the set one or more channels wherein, when voice data of a plurality of speakers are received and the user terminals are determined to be first-type terminals, the channel control server transmits voice data of each speaker through a respective channel corresponding to each speaker from among the generated channels, wherein, when voice data of a plurality of speakers are received and the user terminals are determined to be second-type terminals, the channel control server transmits the voice data of the plurality of speakers to the user terminals through a single channel selected from among the generated channels, wherein the first-type terminals are terminals capable of identifying a speaker of first voice data based on a channel through which the first voice data has been received, and wherein the second-type terminals are terminals capable of identifying a speaker of second voice data by analyzing a source of the second voice data, regardless of a channel through which the second voice data has been received.

10. The voice data transmission system of claim 9, wherein the voice data collection server is configured to analyze vocal intensities of voice data collected from the user terminals and select voice data of a particular speaker based on a result of analysis.

11. A voice data transmission apparatus, comprising:

a processor; and a memory configured to store instructions, wherein the instructions, when executed by the processor, cause the processor to:

receive voice data of a plurality of speakers including voice data of a particular speaker from a voice data collection server;

determine whether destination terminals are first-type terminals; and based on a determination that the destination terminals are the first-type terminals, transmit the received voice data to the destination terminals through a channel corresponding to the particular speaker, from among a plurality of predefined channels for the destination terminals, wherein the instructions further cause the processor to, based on a determination that the destination terminals are second-type terminals, transmit the voice data of the plurality of speakers to the destination terminals through a single channel, wherein the first-type terminals are terminals capable of identifying a speaker of first voice data based on a channel through which the first voice data has been received, and wherein the second-type terminals are terminals capable of identifying a speaker of second voice data by analyzing a source of the second voice data, regardless of a channel through which the second voice data has been received.

12. The voice data transmission apparatus of claim 11, wherein a number of the plurality of predefined channels is greater than a number of voice data collected by the voice data collection server.

13. The voice data transmission apparatus of claim 12, wherein the number of the plurality of predefined channels is determined based on a number of destination terminals.

14. The voice data transmission apparatus of claim 11, wherein the instructions further cause the processor to:

determine whether the particular speaker of the received voice data is a new speaker; and based on a determination that the particular speaker of the received voice data is not the new speaker, transmit the received voice data to the destination terminals through a channel that is previously allocated to previously-received voice data.

15. The voice data transmission apparatus of claim 11, wherein the instructions further cause the processor to:

determine whether the particular speaker of the received voice data is a new speaker; and based on a determination that the particular speaker of the received voice data is the new speaker, transmit the received voice data to the destination terminals through a least recently used channel among the plurality of predefined channels.

16. The voice data transmission apparatus of claim 11, wherein the particular speaker is one of a plurality of speakers, of which respective voice data are received from the voice data collection server, and a number of the plurality of predefined channels is constant regardless of a number of the plurality of speakers.

* * * * *